No. 792,292. PATENTED JUNE 13, 1905.
C. H. SMITH.
LOCK NUT.
APPLICATION FILED AUG. 19, 1904.
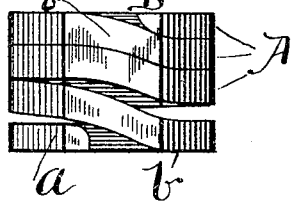
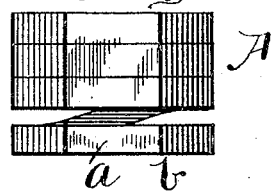
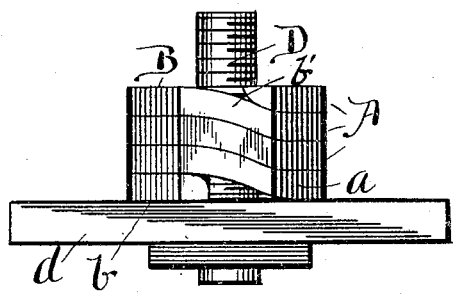
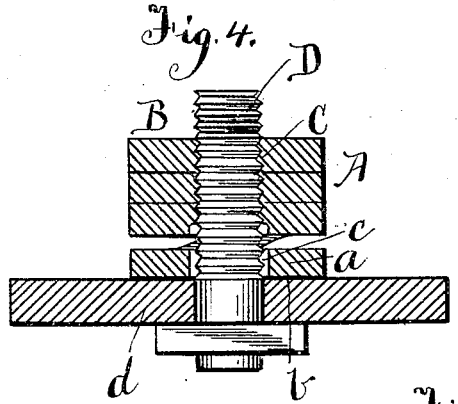
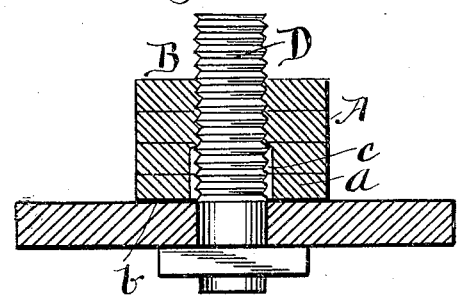
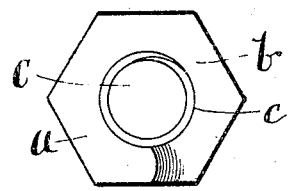
Witnesses:
William P. Bond
Walker Banning
Inventor
Charles H. Smith
By Banning & Banning
Attys.

No. 792,292.

Patented June 13, 1905.

UNITED STATES PATENT OFFICE.

CHARLES H. SMITH, OF ROCKFORD, ILLINOIS.

LOCK-NUT.

SPECIFICATION forming part of Letters Patent No. 792,292, dated June 13, 1905.

Application filed August 19, 1904. Serial No. 221,418.

*To all whom it may concern:*

Be it known that I, CHARLES H. SMITH, a citizen of the United States, residing at Rockford, in the county of Winnebago and State of Illinois, have invented certain new and useful Improvements in Lock-Nuts, of which the following is a specification.

The object of this invention is to provide a lock-nut which can be inserted and held in place without the necessity for using keys, pins, or other locking devices and which can be inserted by means of a wrench of any usual and ordinary character, which obviates the necessity for providing unusual or special appliances for screwing the nut into place.

A further object of the invention is to so construct the nut that it will combine within itself all the features necessary to lock it in place, such features being so arranged that they will act automatically and lock the nut by the mere operation of turning the same into place.

The invention consists in the features of construction and combination of parts hereinafter described and claimed.

In the drawings, Figures 1 and 2 are side elevations of the nut in a normal or unlocked position; Fig. 3, a view showing the nut locked on a bolt; Fig. 4, a cross-sectional view showing the nut in place on a bolt and in unlocked position; Fig. 5, a similar view showing the nut in locked position, and Fig. 6 an end view of the nut.

The nut is constructed in any usual and well-known shape from a strip of steel bent or turned when in soft or annealed condition to form a series of body-coils A, terminating in a locking end coil or coils *a*. The coils are so formed or turned as to provide a flat body-face B and a flat end face *b*, parallel with one another, so that the completed nut will have the general shape and appearance of a nut of ordinary construction. The coils are formed of substantially uniform thickness from end to end of the nut and have their flat contacting faces lying parallel with the outer body-faces of the nut, except for the connecting portions *b'* of the several coils, which are sharply bent or turned into oblique relation to the coils and serve as a means for locking the coils together and preventing their lateral displacement with respect to one another which might occur if the coils were arranged on a uniform slope or bevel.

As shown, the nut is made in hexagonal form, although it might be made square, round, or of any other suitable shape, since the nut can be cut or pressed to have a suitable shape after the coils have been bent or turned.

The body-coils, which form the body of the nut, are provided with a screw-threaded opening C therein and the locking end coil or coils are provided with a smooth bore *c* of slightly-greater diameter than the screw-threaded bore or perforation. The locking end coil or coils are outwardly sprung from the body portion into the position shown in Figs. 1, 2, and 4, which is the normal or unlocked position of the nut.

After the nut has been formed as above specified it is tempered to give the locking end coil or coils a resiliency, so that they form, in effect, a spring normally open from the body of the nut and adapted to be forced back into contact therewith under pressure.

As shown, the nut is applied to a screw-threaded bolt D, which passes through a fish-plate *d* or other suitable object, and the nut is screwed down by means of a wrench of any ordinary character until the spring coil or end contacts the fish-plate, after which the nut is still further screwed down to compress the resilient coils into the position shown in Fig. 5, in which the nut will be held under a strong spring tension on the bolt, which prevents its being accidentally removed and necessitates the use of a considerable degree of pressure to unscrew it, since the pressure of the spring will tend to hold the screw-threads of the nut in tight contact with those of the bolt. The bore in the locking or distended portion of the nut is of sufficient diameter to clear the screw-threads on the bolt, so that as the parts are contracted by the movement of the nut there will be no injury to the threads of the bolt, which would be the case if the screw-threads were carried entirely through the nut.

By making the nut in the manner indicated the coiling and shape of the nut can be very easily accomplished before the tempering operation, and after such tempering operation the entire nut will be extremely strong and durable and at the same time afford the necessary spring action or resiliency required in the locking operation.

The nut possesses a very distinct advantage from the fact that the locking is accomplished by the mere turning of the nut, which affords a great saving in time as well as in the expense of additional locking means, such as pins, keys, &c.

The nut is one that can be very quickly and readily manufactured by machinery and can be applied to bolts of the ordinary style and construction without the necessity for making any change whatsoever in the bolt, and the nut can be applied by any wrench capable of manipulating ordinary nuts of similar size and shape.

What I regard as new, and desire to secure by Letters Patent, is—

A lock-nut formed from a series of connected coils, each of the coils having its contacting faces in parallel relation to the outer end faces of the nut and having the connecting portions between adjacent coils bent or formed in oblique relation to the contact-faces of the coils, the body of the nut being provided with a hole of uniform diameter having an uninterrupted, continuous and uniform screw-thread terminating in an enlarged bore having smooth walls, the outer coil of the nut at one end being formed of spring material and normally outwardly projected from the screw-threaded body of the nut and adapted to be forced back against said body, in combination with a screw-threaded bolt having a uniform diameter and of a size to allow the nut to be easily screw-threaded thereonto and to have its expanded end coil compressed by continued revolution of the nut to be forced back onto and abut against the body portion thereof and exert a spring tension to lock the nut onto the bolt, substantially as described.

CHARLES H. SMITH.

Witnesses:
D. O. DUNCAN,
E. M. SWAN.